(12) United States Patent
Iwasawa

(10) Patent No.: US 8,886,527 B2
(45) Date of Patent: Nov. 11, 2014

(54) SPEECH RECOGNITION SYSTEM TO EVALUATE SPEECH SIGNALS, METHOD THEREOF, AND STORAGE MEDIUM STORING THE PROGRAM FOR SPEECH RECOGNITION TO EVALUATE SPEECH SIGNALS

(75) Inventor: Toru Iwasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 990 days.

(21) Appl. No.: 12/991,783

(22) PCT Filed: Apr. 16, 2009

(86) PCT No.: PCT/JP2009/057661
§ 371 (c)(1),
(2), (4) Date: Nov. 9, 2010

(87) PCT Pub. No.: WO2009/150894
PCT Pub. Date: Dec. 17, 2009

(65) Prior Publication Data
US 2011/0071823 A1 Mar. 24, 2011

(30) Foreign Application Priority Data
Jun. 10, 2008 (JP) ................. 2008-152019

(51) Int. Cl.
*G10L 25/00* (2013.01)
*G10L 21/00* (2013.01)
*G10L 15/00* (2013.01)
*G10L 21/02* (2013.01)
*G10L 15/28* (2013.01)
*G10L 25/78* (2013.01)

(52) U.S. Cl.
CPC ................. *G10L 15/28* (2013.01); *G10L 25/78* (2013.01)
USPC ........... 704/231; 704/200; 704/211; 704/214; 704/215; 704/233; 704/270; 704/270.1; 704/275; 381/71.1

(58) Field of Classification Search
CPC ....... G10L 15/00; G10L 15/22; G10L 15/222; G10L 15/20; G10L 21/00; G10L 21/02; G10L 21/0202; G10L 21/0205; G10L 21/0208; G10L 21/0216; G10L 21/0264; G10L 21/0272; G10L 21/028; G10L 21/034; G10L 21/0324; G10L 21/0364; G10L 25/00; G10L 25/03; G10L 25/78; G10L 25/84; G10L 25/93; G10L 2015/00; G10L 2015/22; G10L 2015/226; G10L 2021/00; G10L 2021/02; G10L 2021/0208; G10L 2021/02087; G10L 2021/02082; G10L 2021/0216; G10L 2021/02163; G10L 2021/02165; G10L 2021/02166; G10L 2021/02168; G10L 2021/0316; G10L 2021/057; G10K 11/1784; G10K 11/1788; G10K 2210/301; G10K 2210/3045
USPC ......... 704/200, 211, 214, 215, 231, 233, 270, 704/270.1, 275; 381/71.1–71.14
See application file for complete search history.

(56) References Cited

U.S. PATENT DOCUMENTS

| 4,984,274 | A | * | 1/1991 | Yahagi et al. | 704/251 |
|---|---|---|---|---|---|
| 5,764,852 | A | * | 6/1998 | Williams | 704/243 |
| 6,216,103 | B1 | * | 4/2001 | Wu et al. | 704/253 |
| 6,801,604 | B2 | * | 10/2004 | Maes et al. | 379/88.17 |
| 6,937,980 | B2 | * | 8/2005 | Krasny et al. | 704/231 |
| 7,710,982 | B2 | * | 5/2010 | Ohmuro et al. | 370/395.64 |
| 8,311,814 | B2 | * | 11/2012 | Ong et al. | 704/215 |
| 2005/0114118 | A1 | * | 5/2005 | Peck | 704/208 |
| 2005/0171769 | A1 | * | 8/2005 | Naka et al. | 704/214 |
| 2008/0120100 | A1 | * | 5/2008 | Takeda et al. | 704/233 |

FOREIGN PATENT DOCUMENTS

| JP | 4-184400 A | 7/1992 |
|---|---|---|
| JP | 9-22300 A | 1/1997 |
| JP | 2000163098 A | 6/2000 |
| JP | 2003177787 A | 6/2003 |
| JP | 2007156364 A | 6/2007 |
| JP | 2007271772 A | 10/2007 |
| JP | 2008009120 A | 1/2008 |

OTHER PUBLICATIONS

International Search Report for PCT/JP2009/057661 mailed May 26, 2009.

* cited by examiner

*Primary Examiner* — Paras D Shah
(74) *Attorney, Agent, or Firm* — Sughrue Mion, PLLC

(57) ABSTRACT

A purpose is to suppress recognition process delay generated due to load in signal processing. Included is a speech input means 10 that inputs a speech signal, an output evaluation means 20 that evaluates whether or not the speech signal input by the speech input means 10 is the speech signal in a sound section, which is a speech section assuming that a speaker is speaking, and outputs the speech signal as a speech signal to be processed only when evaluated as the speech signal in the sound section, a signal processing means 30 that performs signal processing to the speech signal, which is output by the output evaluation means 20 as the speech signal to be processed, and a speech recognition processing means 40 that performs a speech recognition process to the speech signal which is signal-processed by the signal processing means 30.

6 Claims, 8 Drawing Sheets

_US 8,886,527 B2_

SPEECH RECOGNITION SYSTEM TO EVALUATE SPEECH SIGNALS, METHOD THEREOF, AND STORAGE MEDIUM STORING THE PROGRAM FOR SPEECH RECOGNITION TO EVALUATE SPEECH SIGNALS

The present application is the National Phase of PCT/JP2009/057661, filed Apr. 16, 2009, which claims priority rights of and is based on Japanese Patent Application No. 2008-152019 filed on Jun. 10, 2008 in the Japanese Patent Office, the entire contents of which are hereby incorporated by reference.

TECHNICAL FIELD

The present invention relates to a speech recognition system, a speech recognition method, and a storage medium storing a program for speech recognition, and particularly to a speech recognition system, a speech recognition method, and a storage medium storing a program for speech recognition that involve signal processing in a preceding stage of a speech recognition process.

BACKGROUND ART

For example, in a system with limited resource of a CPU (Central Processing Unit) or a memory, such as an embedded system, in a case of performing a speech recognition process involving an advanced signal processing including a noise suppression process or the like, a situation could occur in which the signal processing will not be within the actual time due to the poor performance of the system itself or a conflict with other processes. If the signal processing, which is a preceding stage process, does not fall within the actual time, delay is generated in the speech recognition process, and thereby resulting to generate a problem such as a delayed response and an overflow of a buffer for speech input.

In regard to such a problem, patent document 1, for example, discloses a method to pass the amount of characteristics to a recognition engine when detecting no sound in the speech recognition process whether or not it is determined to be an end.

Further, patent document 2, for example, discloses a method to suppress the delay by suppressing the number of accesses to an HDD (Hard Disk Drive) in the speech recognition process.

Furthermore, patent document 3, for example, discloses a speech recognition apparatus that evaluates whether it is a speech section or a noise section, creates a speech model from an acoustic characteristic amount of a noise section signal, calculates a speech characteristic amount average from the acoustic characteristic amount of the speech section signal, and obtains a speech recognition result using them.

Citation List

Patent Literature

[Patent document 1] Japanese Unexamined Patent Application Publication No. 2007-271772
[Patent document 2] Japanese Unexamined Patent Application Publication No. 2003-177787
[Patent document 3] Japanese Unexamined Patent Application Publication No. 2007-156364

SUMMARY OF INVENTION

Technical Problem

By using the method disclosed in patent document 1 or patent document 2, there is a possibility that the load of the speech recognition process can be suppressed. However, there is no consideration in either of them to suppress the load in the signal processing, which corresponds to the preceding stage process of the speech recognition process, and thus they cannot address the problem that causes recognition process delay due to the load in the signal processing.

Note that the speech recognition apparatus disclosed in patent document 3 is a method that assumes the case of requiring high speech recognition performance rather than responsiveness and takes measures to both of additive noise by background noise and multiplicative noise by transfer characteristics, and does not consider to resolve the recognition process delay. Further, patent document 3 describes to perform noise suppression of an input digital signal if a speech/noise evaluation result is "speech section", but does not describe that the load in the signal processing can be suppressed by this. Therefore, this evaluation result only indicates that this section is specified as the speech section, which is a noise suppressed section, to be processed. Then, the signal processing is performed at all times to the sections other than the speech section (the noise section in patent document 3) such as the process to generate estimated noise for the noise suppression, and thus the problem that causes the recognition process delay due to the load in the signal processing cannot be addressed.

Therefore, the present invention provides a speech recognition system, a speech recognition method, and a storage medium storing a program for speech recognition that can suppress the recognition process delay generated due to the load in the signal processing, which is performed in the preceding stage of the speech recognition process.

Solution to Problem

A speech recognition system according to the present invention includes a speech input means that inputs a speech signal, an output evaluation means that evaluates whether the speech signal input by the speech input means is the speech signal in a sound section and outputs the speech signal as the speech signal to be processed only when the speech signal is evaluated as the speech signal in the sound section, in which the sound section is a speech section that assumes a speaker is speaking, a signal processing means that performs signal processing to the speech signal output by the output evaluation means as the speech signal to be processed, and a speech recognition processing means that performs a speech recognition process to the speech signal, in which the speech signal is signal-processed by the signal processing means.

A speech recognition method according to the present invention includes evaluating whether a speech signal input via a speech input means is the speech signal in a sound section and outputting the speech signal as a process of signal processing only when the speech signal is evaluated as the speech signal in the sound section, in which the sound section is a speech section that assumes a speaker is speaking, performing the signal processing to the speech signal output as the process of the signal processing, and performing a speech recognition process to the speech signal-processed signal.

A storage medium storing a program for speech recognition according to the present invention that causes a computer to execute a process includes an output evaluation process that evaluates whether a speech signal input via a speech input means is the speech signal in a sound section and outputs the speech signal as a process of signal processing only when the speech signal is evaluated as the speech signal in the sound section, in which the sound section is a speech section that assumes a speaker is speaking, the signal processing to the speech signal output as the process of the signal processing, and a speech recognition process to the signal-processed speech signal.

Advantageous Effects of Invention

According to the present invention, it is possible to suppress the recognition process delay generated due to the load in the signal processing, which is performed in the preceding stage of the speech recognition process. The reason for that is that the speech signal supply to the signal processing means is limited only to the section necessary in the subsequent stage process (signal processing or speech recognition process), and thus the load in the signal processing can be reduced.

DESCRIPTION OF EMBODIMENTS

Figure 1:
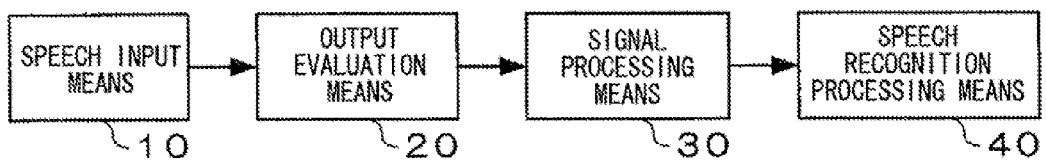
FIG. 1 is a block diagram showing a configuration example of a speech recognition system according to the present invention.

Hereinafter, the best mode for carrying out the present invention is explained in detail with reference to the drawings. FIG. 1 is a block diagram showing a configuration example of the speech recognition system according to the present invention. As shown in FIG. 1, the speech recognition system is a speech recognition system that involves signal processing in the preceding stage of the speech recognition process and includes a speech input means 10, an output evaluation means 20, a signal processing means 30, and a speech recognition processing means 40.

The speech input means 10 inputs a speech signal.

The output evaluation means 20 evaluates whether the speech signal input from the speech input means 10 is the speech signal in a sound section, which is the speech section assuming that a speaker is speaking, and outputs the speech signal as the speech signal to be processed only when the signal is evaluated as the speech signal in the sound section.

The output evaluation means 20 in this example is applied only when the speech signal required for the signal processing means 30 or the speech recognition processing means 40 of the subsequent stages is the speech signal in the sound section. Note that the output evaluation means 20 in this example may discard the speech signal not evaluated as the speech signal in the sound section.

The signal processing means 30 performs the signal processing to the speech signal output as the speech signal to be processed by the output evaluation means 20.

The speech recognition processing means 40 performs a speech recognition process to the speech signal processed by the signal processing means 30.

According to such a configuration, as the output evaluation means 20 limits the speech signal supply to the signal processing means 30 only to the signal in the necessary section in the process of the subsequent stage (signal processing or speech recognition process), the execution of the signal processing can be reduced. As a result, the load in the signal processing is not applied at all times, and the recognition process delay generated due to the load in the signal processing can be suppressed.

Note that if the speech recognition processing means 40 or the signal processing means 30 performs adaptation to the environment, the output evaluation means 20 can also be configured to output the speech signal in an adaptive speech section, which is required at the time of environment adaptation, in addition to the sound section. In such a case, the output evaluation means 20 evaluates whether the speech signal input by the speech input means 10 is the speech signal in the sound section or the adaptive speech section, which is the speech section required at the time of environment adaptation in the subsequent stage process, and only when the speech signal is evaluated as the speech signal in the sound section or the speech signal in the adaptive speech signal, the output evaluation means 20 may output the speech signal as the speech signal to be processed.

Further, if the speech input means 10 inputs the speech signal using a plurality of speech input channels including a channel for speech collection and a channel for noise collection, the output evaluation means 20 may use the speech signal of the channel for speech collection in the evaluation of the sound section and the speech signal of channel for noise collection in the evaluation of the adaptive speech section.

Figure 2:
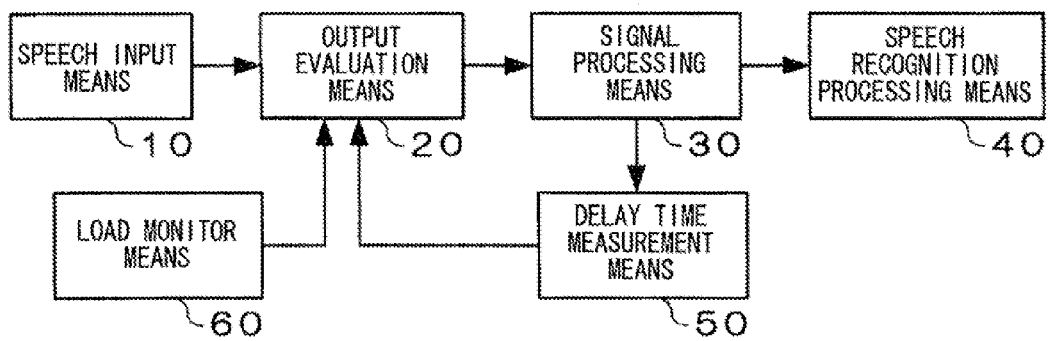
FIG. 2 is a block diagram showing another configuration example of the speech recognition system according to the present invention.

Further, FIG. 2 is a block diagram showing another configuration example of the speech recognition system according to the present invention. As shown in FIG. 2, the speech recognition system may further include a delay time measurement means 50.

The delay time measurement means 50 measures the delay time by the process for the speech signal. The delay time measurement means 50 may measure the time delay, of a certain speech signal for example, in the signal processing by the signal processing means 30 by calculating a time difference between the time when the speech signal is input to the signal processing means 30 from the output evaluation means 20 and the time when the speech signal is output from the signal processing means 30. Moreover, for a certain speech signal for example, the delay time in the signal processing in the signal processing means 30 and the speech recognition process in the speech recognition processing means 40 may be measured by calculating the time difference between the time when the speech signal is input to the signal processing means 30 from the output evaluation means 20 and the time when the recognition process in the speech recognition processing means 40 is completed.

In such a case, the output evaluation means 20 may change the evaluation method (or standard) of the speech signal to be processed according to the delay time measured by the delay time measurement means 50.

Further, the speech recognition system may further include a load monitor means 60. The load monitor means 60 monitors the process load of the apparatus that builds the speech recognition system.

In such a case, the output evaluation means 2 may change the evaluation method (or standard) of the speech signal to be processed according to the process load monitored by the load monitor means 60.

[First Embodiment]

Figure 3:
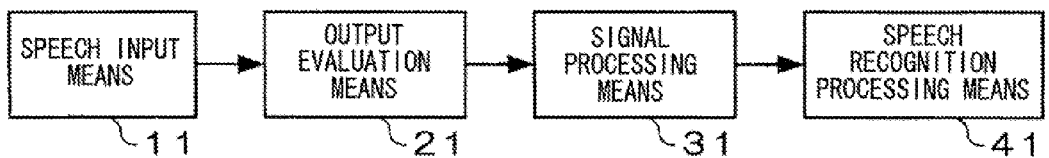
FIG. 3 is a block diagram showing a configuration example of the speech recognition system according to a first embodiment.

Hereinafter, more specific embodiments are described. FIG. 3 is a block diagram showing a configuration of a speech recognition system according to the first embodiment of the present invention. The speech recognition system shown in FIG. 3 includes a speech input means 11, an output evaluation means 21, a signal processing means 31, and a speech recognition processing means 41.

The speech input means 11 inputs a speech signal. The speech input means 11 is realized by a speech input apparatus, such as a microphone, for example. Note that it can be considered that this can be realized by a data receiving apparatus that performs input by receiving the speech signal data transmitted via a network. Note that if the speech input means 11 includes a processing function that encodes or converts the input speech in an appropriate data format, the speech input means is realized by an encoding apparatus and a data conversion apparatus in addition to the above apparatuses.

The output evaluation means 21 evaluates whether the speech signal input from the speech input means 11 corresponds to the speech signal in the sound section required in the signal processing means 31 or the speech recognition processing means 41 of the subsequent stage or includes the speech signal in the sound section, and outputs only the speech signal in the sound section. The sound section here indicates the speech section (section on the time axis of the speech signal) in which a speaker is assumed to be speaking. The output evaluation means 21 is realized by a CPU or the like that operates in accordance with a program, for example. Further, it can be realized by hardware including a meter and a switch circuit etc.

The evaluation method of the sound section can be realized by a similar method as the speech detection method in the speech recognition process, for example. Specifically, it can be carried out by comparing absolute power, a power fluctuation, and a S/N ratio fluctuation of the input speech with a predetermined threshold and detecting a beginning or an end of the sound section. More specifically, for example, a stage when the input speech exceeds certain power shall be the start of the sound section, and at a stage when the input speech falls below certain power after detecting the start of the speech section, the sound section may be detected to have completed. As for the evaluation process, when the start of the sound section is detected for the input speech or the end of the sound section is not detected for the speech signal input after the start of the sound signal, the signal may be evaluated as the speech signal in the sound section.

Note that as for the unit of the speech signal processed by the output evaluation means 21, all the input speech signals shall not be one unit, but like a frame length used as a minimum unit of the signal processing, for example, a minimum unit in which consecutively input speech signals are divided by certain time unit may be defined and used. The minimum unit of the input to the subsequent stage signal processing means 31 shall be one unit. Note that when required to evaluate whether or not it is in the sound section using the speech signals for certain time, the speech signals for the certain time may be buffered and evaluated, and each speech signal may be determined to be output or not according to the evaluation result. Suppose that the speech signal input from the speech input means 11 is specified by a longer time length than the unit of the speech signal in the corresponding process, then the output evaluation means 21 may evaluate whether the sound section is included the speech signal input from the speech input means 11, and if the output evaluation means 21 evaluates that the sound section is included, the output evaluation means 21 may extract only the speech signal in the corresponding sound section, and output it to the subsequent stage signal processing means 31 as the speech signal to be processed.

The signal processing means 31 performs the signal processing to the speech signal passed from the output evaluation means 21 and outputs it to the speech recognition processing means 41 as the signal-processed signal. The signal processing means 31 is a means to perform a noise suppression process to suppress noise using the technique such as a noise canceller and a microphone array. In general, the speech recognition process is known to deteriorate the accuracy by the influence of noise. In order to prevent this, there are various methods suggested to suppress the noise in the preceding stage process and input the speech with less residual noise. Note that in order to input the speech with less residual noise, more advanced signal processing is required.

The speech recognition processing means 41 performs the speech recognition process to the signal, which is signal-processed by the signal processing means 31.

Figure 4:
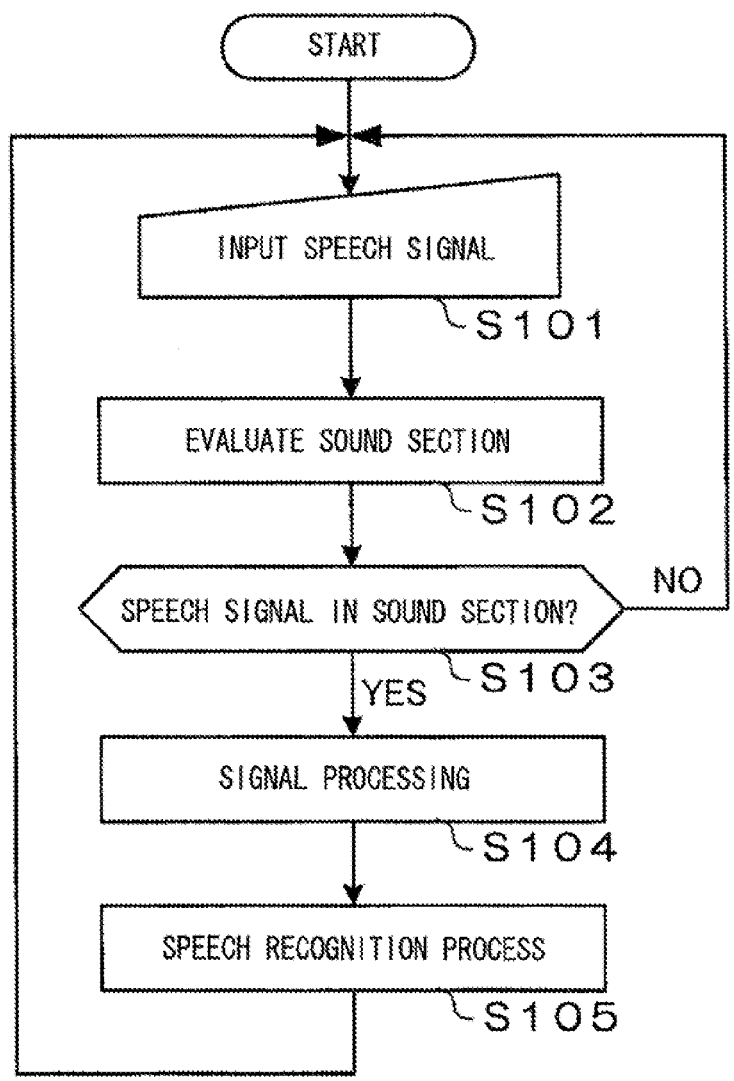
FIG. 4 is a flowchart showing an example of an operation according to the first embodiment.

Next, an operation of this embodiment is explained. FIG. 4 is a flowchart showing an example of the operation of this embodiment. As shown in FIG. 4, if the speech signal is input via the speech input means 11 (step S101), the output evaluation means 21 evaluates whether the input speech signal is the speech signal in the sound section or not (step S102).

At this time, when the speech signal is evaluated as the speech signal in the sound section, the output evaluation means 21 outputs the speech signal to the signal processing means 31 as the speech signal to be processed (Yes in step S103).

To the speech signal (the speech signal in the sound section here) passed from the output evaluation means 21 as the speech signal to be processed, the signal processing means 31 performs the signal processing such as a noise suppression process, and outputs it to the speech recognition processing means 41 as the signal-processed signal (step S104).

Then, the speech recognition processing means 41 performs the speech recognition process to the signal-processed signal which is input from the signal processing means 31 (step S105).

On the other hand, in step S103, if the speech signal is evaluated not to be the speech signal in the sound section, the output evaluation means 21 does not output the speech signal to the signal processing means 31 and discards it, and then completes the process (NO in step S103). The subsequent process to this speech signal is omitted by not outputting the speech signal to the signal processing means 31.

Note that although the abovementioned example explained the case in which the section necessary for the subsequent process is the sound section, the output evaluation means 21 may be configured to output the speech signal in the adaptive speech section which is required at the time of environment adaptation in addition to the sound section. This configuration is effective when the signal processing means 31 or the speech recognition processing means 41 performs environment adaptation for the purpose of preventing the deterioration of speech recognition accuracy.

As an example of a method of adaptation to the environment, there is an adaptive filter in the signal processing and CMN (Cepstrum Mean normalization) in the speech recognition process, for example. If such environment adaptation is required to follow the environment change that is not evaluated as the sound section (for example, a change in the surrounding stationary noise level), it is considered to be effective to pass the speech signal in the adaptive speech section, which is assumed to be necessary for that, to the signal processing means 31 and the speech recognition processing means 41.

As the evaluation method of the adaptive speech section, it may be performed by evaluating whether the stationary noise of the input signal has fluctuated or not as compared to the past signal (that is, the value corresponding to N at the time of calculating the S/N ratio has fluctuated or not) by the unit of the speech section of a certain width.

Figure 5:
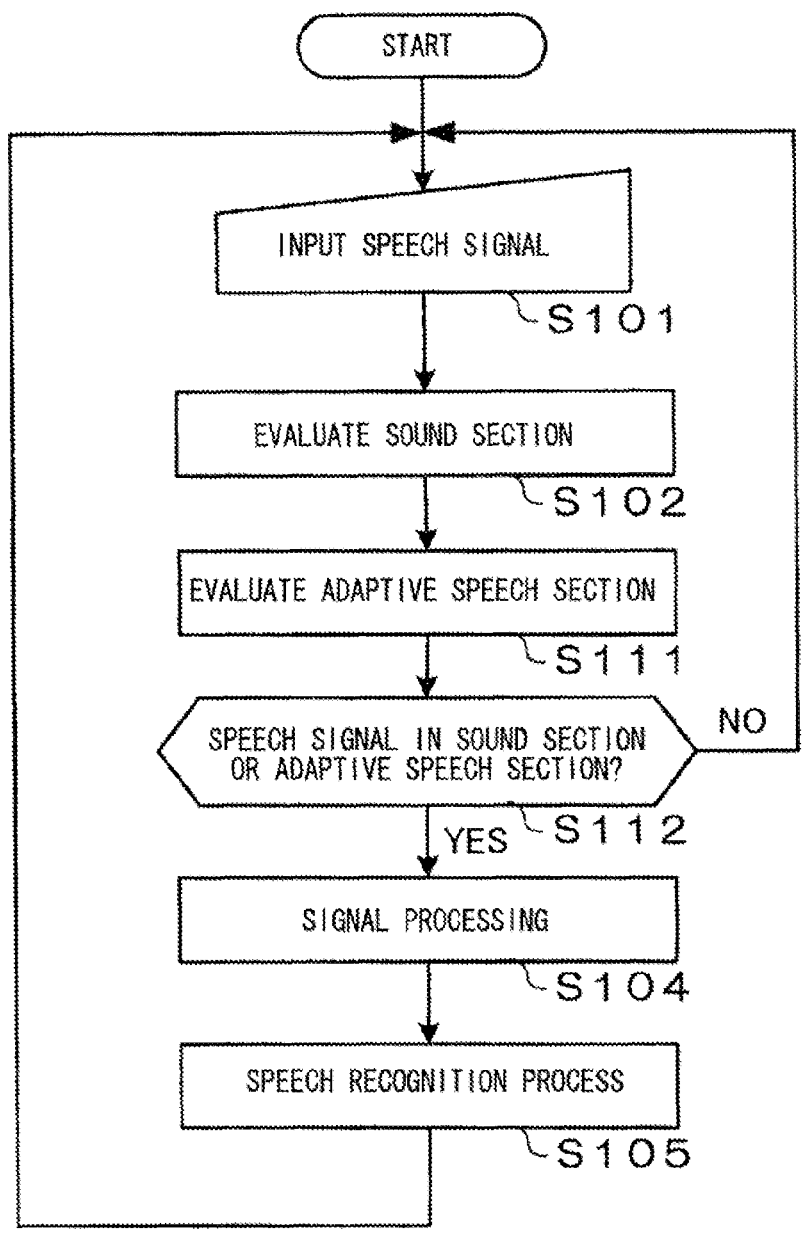
FIG. 5 is a flowchart showing another example of the operation according to the first embodiment.

FIG. 5 is a flowchart showing an operation example of the speech recognition system of this example. As shown in FIG. 5, the output evaluation means 21 performs the evaluation process of such an adaptive speech section (step S111) in addition to the evaluation process of the sound section, for example, every time the speech signal is input. Then, when the input signal is evaluated as the speech signal in the sound section or the speech signal in the adaptive sound section (YES in step S112), the output evaluation means 21 may output the corresponding speech signal to the signal processing means 31 as the speech signal to be processed. At this time, if the input signal is evaluated to be neither of the speech signal in the sound section nor the speech signal in the adaptive speech section, the input signal may not be output to the signal processing means 301 and discarded (NO in step S112). Note that as other steps are same as the flowchart shown in FIG. 4, the explanation is omitted.

In this way, by outputting the speech signal in the adaptive speech section as the speech signal to be processed, it is possible to follow the environment change in the signal processing means 31 and the speech recognition processing means 41, and thereby preventing from the deterioration of the speech recognition accuracy.

Further, the speech input means 11 includes a plurality of speech channels, and if it is possible to receive the speech input from a plurality of speech input devices, the speech signal of a separate channel suitable for each may be used for the evaluation of the sound section and the evaluation of the adaptive speech section in the output evaluation means 21. For example, the speech input means 11 has two inputs of the speech input devices, and use one speech input channel for speech collection and the other speech input channel for noise collection. The channel for speech collection indicates a speech input channel primarily purposed to collect uttered speech. The channel for noise collection indicates a speech input channel primarily purposed to collect sound in the surrounding environment. In the case of such a speech input interface, the output evaluation means 21 may use the speech signal of the channel for speech collection for the evaluation of the sound section, and the speech signal of the channel for noise collection for the evaluation of the adaptive speech section.

As described above, according to this embodiment, by using the output evaluation means 21, the speech signal supply to the speech processing means 31 is limited only to the signals in the section evaluated to be necessary in the subsequent stage process. Thus the execution of the signal processing can be reduced, and the recognition process delay generated due to the load in the signal processing can be suppressed. Moreover, when using the speech signal of different channels suitable for each section in the evaluation of the sound section and the evaluation of the adaptive speech section in the output evaluation means 21, the evaluation of the sound section and the adaptive speech section can be performed more accurately.

[Second Embodiment]

Figure 6:
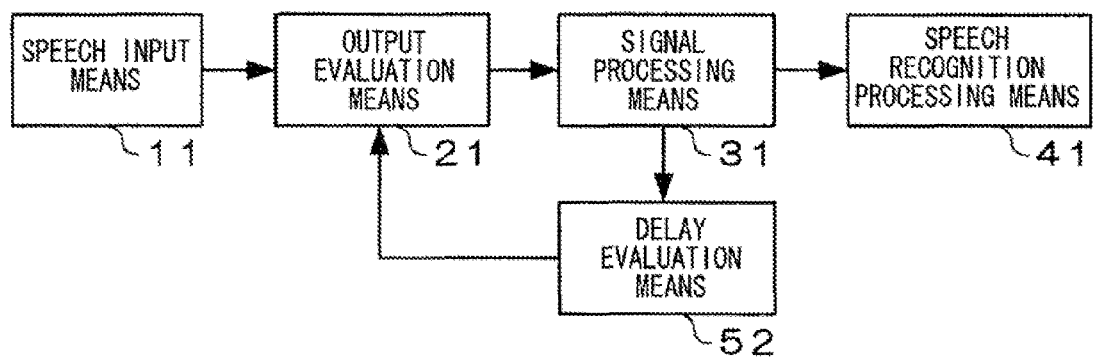
FIG. 6 is a block diagram showing a configuration example of a speech recognition system according to a second embodiment.

Next, the second embodiment of the present invention is described. FIG. 6 is a block diagram showing a configuration example of a speech recognition system according to a second embodiment of the present invention. As shown in FIG. 6, the speech recognition system of this embodiment differs from the first embodiment shown in FIG. 3 in that a delay evaluation means 52 is further included. Further, another different point is that the output evaluation means 21 includes a function to change the evaluation method of the speech signal which is output to be processed.

As for the speech signal, the delay evaluation means 52 measures the delay time from the input time to the signal processing means 31 by the output evaluation means 21 to the output time from the signal processing means 31, and transmits to the output evaluation unit 21 the signal to change the evaluation method of the speech signal according to the measured delay time. Note that the delay evaluation means 52 is shown as an example of a more specific processing means including the function of the delay time measurement means 50 shown in FIG. 2.

The delay evaluation means 52 always measures the delay time before and after the signal processing to the speech signal, and when the delay time satisfies a certain condition, transmits the signal to request for a change of the evaluation method to the output evaluation means 21. The measurement method of the delay time shall be to pass the speech signal passed to the signal processing means 31 by a fixed length frame unit with ID, and the delay time may be measured by calculating the time difference between the output time from the output evaluation means 21 and the output time of the signal processing means 31 of each frame. Further, although in the abovementioned example the process delay time in the signal processing by the signal processing means 31 is measured, it can be considered to measure the processing delay time including the recognition process by the speech recognition processing means 41.

As an example of the signal transmitted by the delay evaluation means 52, there is an alarm signal generated when the delay time exceeds a certain threshold and an alarm release signal generated after the alarm signal is generated and when the delay time becomes normal.

Figure 7:
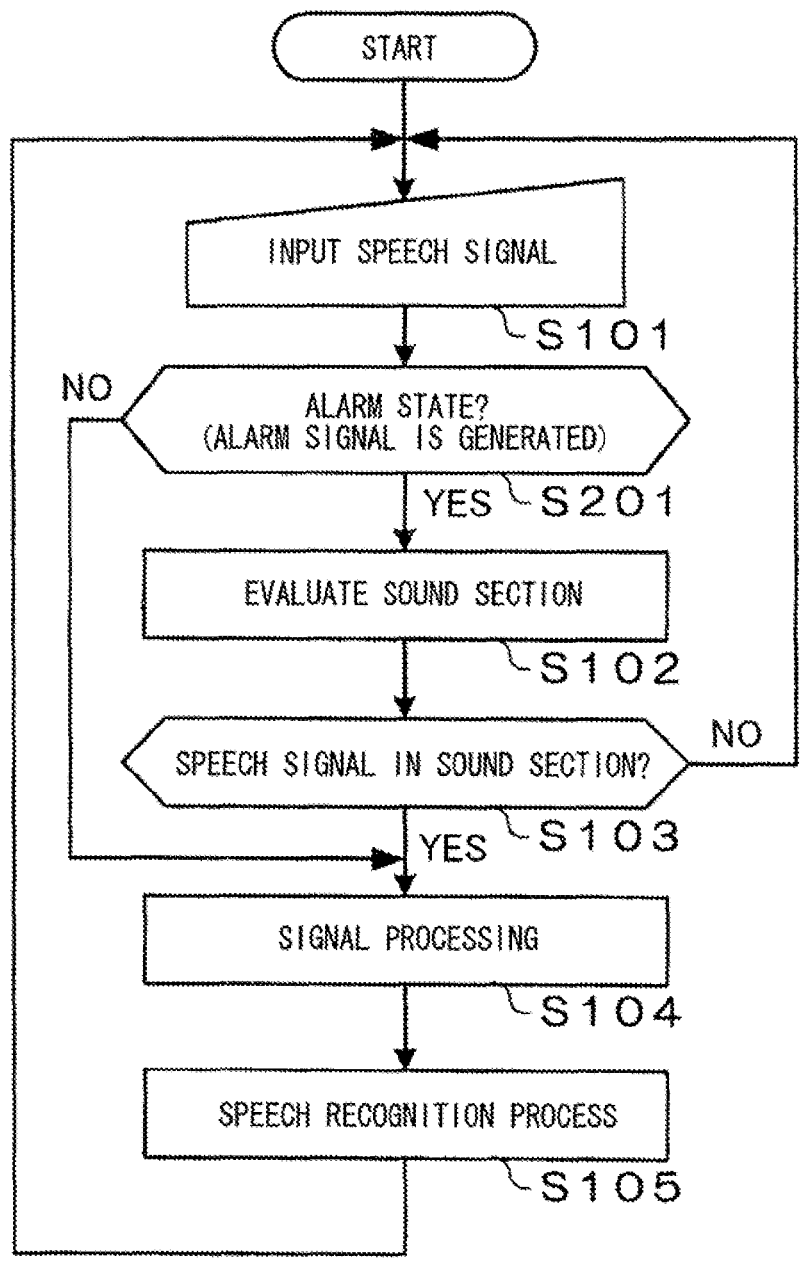
FIG. 7 is a flowchart showing an example of an operation according to the second embodiment.

Next, an operation of this embodiment is explained. FIG. 7 is a flowchart showing an example of the operation of this embodiment. Note that the example shown in FIG. 7 is an example which inputs all the input speech signals to the signal processing means 31 until the delay time exceeds the threshold, and when the delay time exceeds the threshold, changes the evaluation method of the speech signal so that only speech in the sound section is input to the signal processing means 31. In this example, the delay evaluation means 52 outputs to the output evaluation means 21 a signal to select either of the method to have all the input speech signals to be output or only the speech signals in the sound section to be output. The signal to select the method to have all the speech signals to be output corresponds to the alarm release signal, and the signal to select the method to have only the speech signal in the sound section to be output corresponds to the alarm signal.

As shown in FIG. 7, in this embodiment, when the speech signal is input via the speech input means 11 (step S101), the output evaluation means 201 firstly checks the alarm state based on the alarm signal/alarm release signal output from the delay evaluation means 52 (step S201). Note that at the time of starting the recognition process, the alarm state shall be released and the process is performed by the method to pass all the speech signals. In the meantime, the delay evaluation means 52 always calculates the process delay time of the signal processing means 31, and outputs the alarm signal at a stage when the delay time exceeds the upper limit threshold. Note that the specific flow of the process of the delay evaluation means 52 is described later.

If the alarm state is released at this time (NO in step S201), the evaluation of whether or not the input signal is in the sound section is not performed, and the signal processing is performed in the step S104 by outputting all the input signals to the signal processing means 31. Following processes are the same as those of the first embodiment shown in FIG. 4.

On the other hand, as a result of the signal processing to the speech signals so far, after the alarm signal is received from the delay evaluation means 52 in response to the delay time exceeding the upper limit threshold, the alarm state changes to the generated state. If the alarm condition is generated (YES in step S201), the output evaluation means 21 performs the evaluation process of the sound section (step S102), and limits the speech signal to be output. Subsequent processes are the same as those of the first embodiment shown in FIG. 4.

Note that when the delay time falls below or equal to the lower limit threshold and the alarm release signal from the delay evaluation means 52 is received, the alarm state returns to the released state. Thus the output evaluation means 21 returns the evaluation method for the speech signals to the method of outputting all the speech signals.

Figure 8:
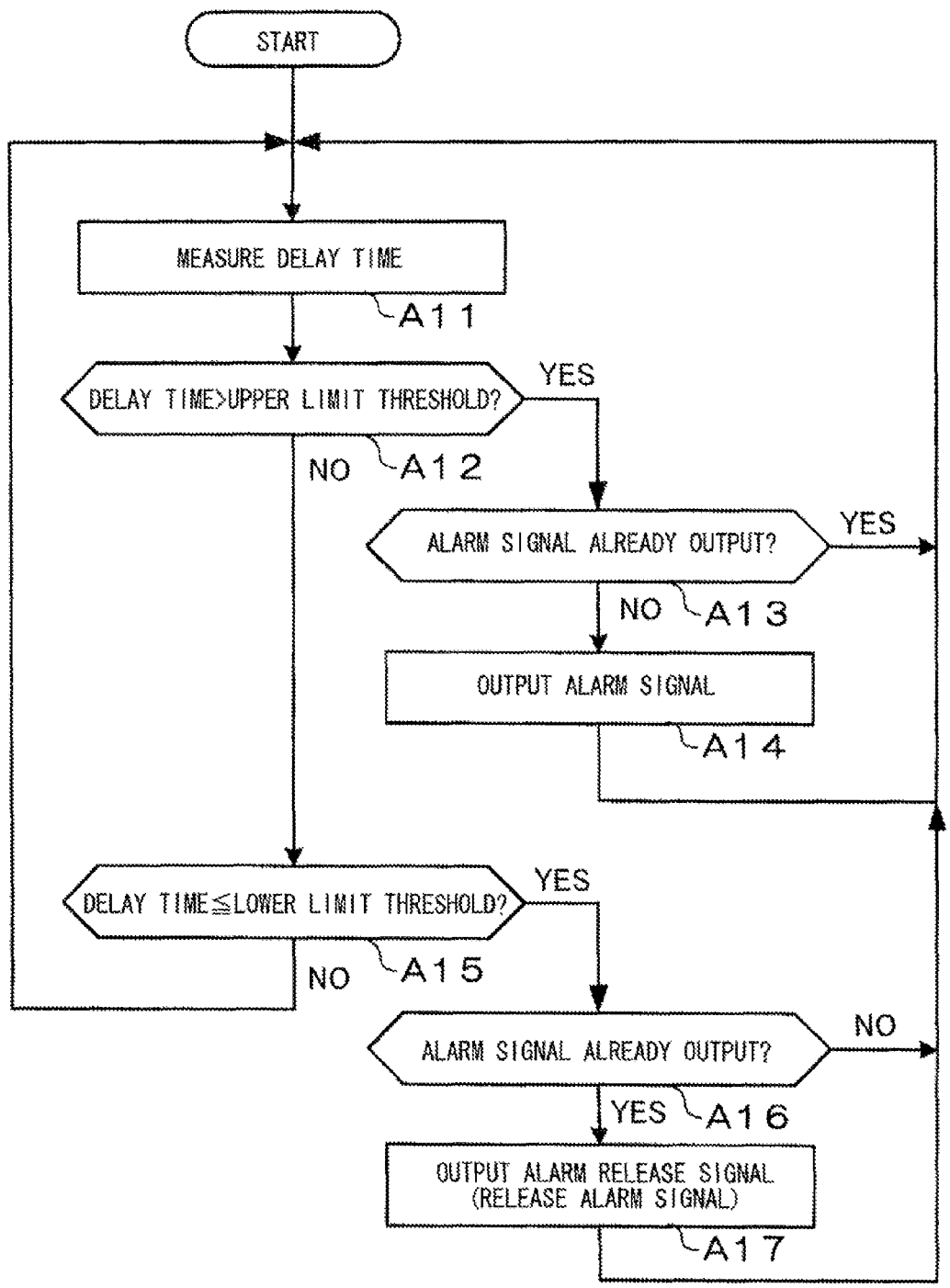
FIG. 8 is a flowchart showing an example of a process flow of a delay evaluation means 52.

Next, an operation of the delay evaluation means 52 is explained. FIG. 8 is a flowchart showing an example of the process flow of the delay evaluation means 52. As shown in FIG. 8, the delay evaluation means 52 measures the delay time every time a speech signal frame is output from the signal processing means 31, for example (step A11). In this example, each speech signal frame is added with a time stamp when passed to the signal processing means 31. The delay evaluation means 52 may measure the delay time by calculating a difference between the time stamp added to this speech signal frame and the time output from the signal processing means 31. Note that other than the method to calculate the delay timing at the timing of output from the signal processing means 31, the delay time can be measured, for example, at the timing when the speech recognition processing means 41 completes the recognition process.

If the delay time is calculated, evaluation is performed whether or not the delay time exceeds the upper limit threshold (step A12). When the delay time is exceeding the upper limit threshold, the output state of the alarm signal is evaluated and if the alarm signal is not already output (NO in step A13), the alarm signal is output (step A14). After that, the process may return to the step A11 and wait for the next speech signal frame to be output. On the other hand, if the alarm signal is already output (YES in step A13), no process is especially performed but the process may return to the step A11.

Next, the delay evaluation means 52 evaluates whether the calculated delay time is less than or equal to the lower limit threshold (step A15). At this time, if the delay time is less than or equal to the lower limit threshold, the output state of the alarm signal is evaluated and if the alarm signal is already output (YES in step A16), the alarm release signal is output (step A17). Then, the process may return to the step A11 and wait for the next speech signal frame to be output. On the other hand, if the alarm signal is already output (NO in step A16), no process is especially performed but the process may return to the step A11.

As described so far, according to this embodiment, it is possible to change the speech signal output from the output evaluation means 21 according to the delay state of the signal processing and the speech recognition process.

[Third Embodiment]

Figure 9:
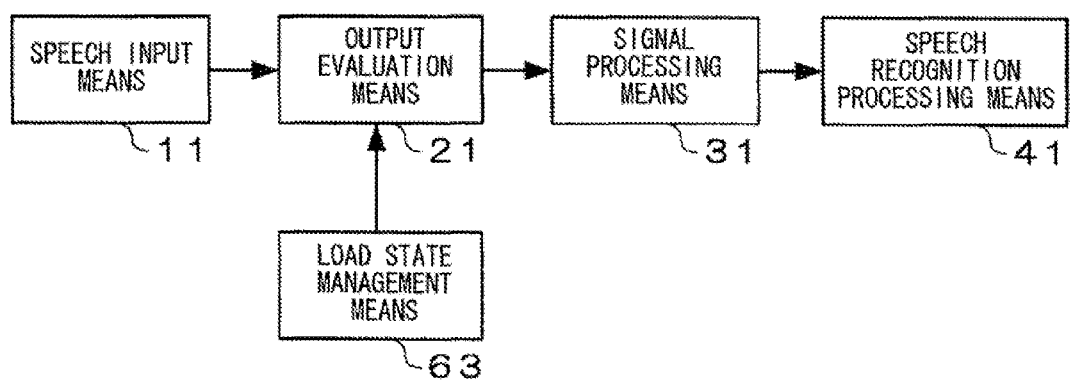
FIG. 9 is a block diagram showing a configuration example of a speech recognition system according to a third embodiment.

Next, the second embodiment of the present invention is described. FIG. 9 is a block diagram showing a configuration example of a speech recognition system according to a third embodiment of the present invention. As shown in FIG. 9, the speech recognition system of this embodiment differs from the speech recognition system of the first embodiment shown in FIG. 3 in that a load monitor means 63 is further included. Further, another different point is that the output evaluation means 21 includes a function to change the evaluation method of the speech signal, which is output to be processed.

The load monitor means 63 monitors the process load for the entire apparatus that builds the speech recognition system, and transmits to the output evaluation means 21 a signal to change the evaluation method of the speech signal according to the monitored load.

This embodiment replaces the delay evaluation means 52 of the second embodiment shown in FIG. 6 with the load monitor means 63. Specifically, the evaluation method of the output evaluation means 21 is changed according to the delay time in the second embodiment, but in this embodiment; it is changed according to the load monitored by the load state management means 63.

The load state management means 63 monitors the load of the entire system, and operates to change the speech signal evaluation method of the output evaluation means 21 according to the load state. The load of the entire system here indicates the load of the entire apparatus that builds the speech recognition system including the load in the case that the other processes (for example state monitoring of a physical sensor and image processing) operate, not only the load by a series of speech recognition processes according to the present invention. Note that the load state management means 63 is indicated as an example of a more specific processing means including the delay time measurement means 50 shown in FIG. 2.

Note that the signal output to the output evaluation means 21 and the operation of the output evaluation means 21 to change the evaluation method in response to the signal may be same as those of the second embodiment.

In this embodiment, the load numeric value (for example, a CPU utilization and a load average) indicating the load state shall be the condition for signal output.

Figure 10:
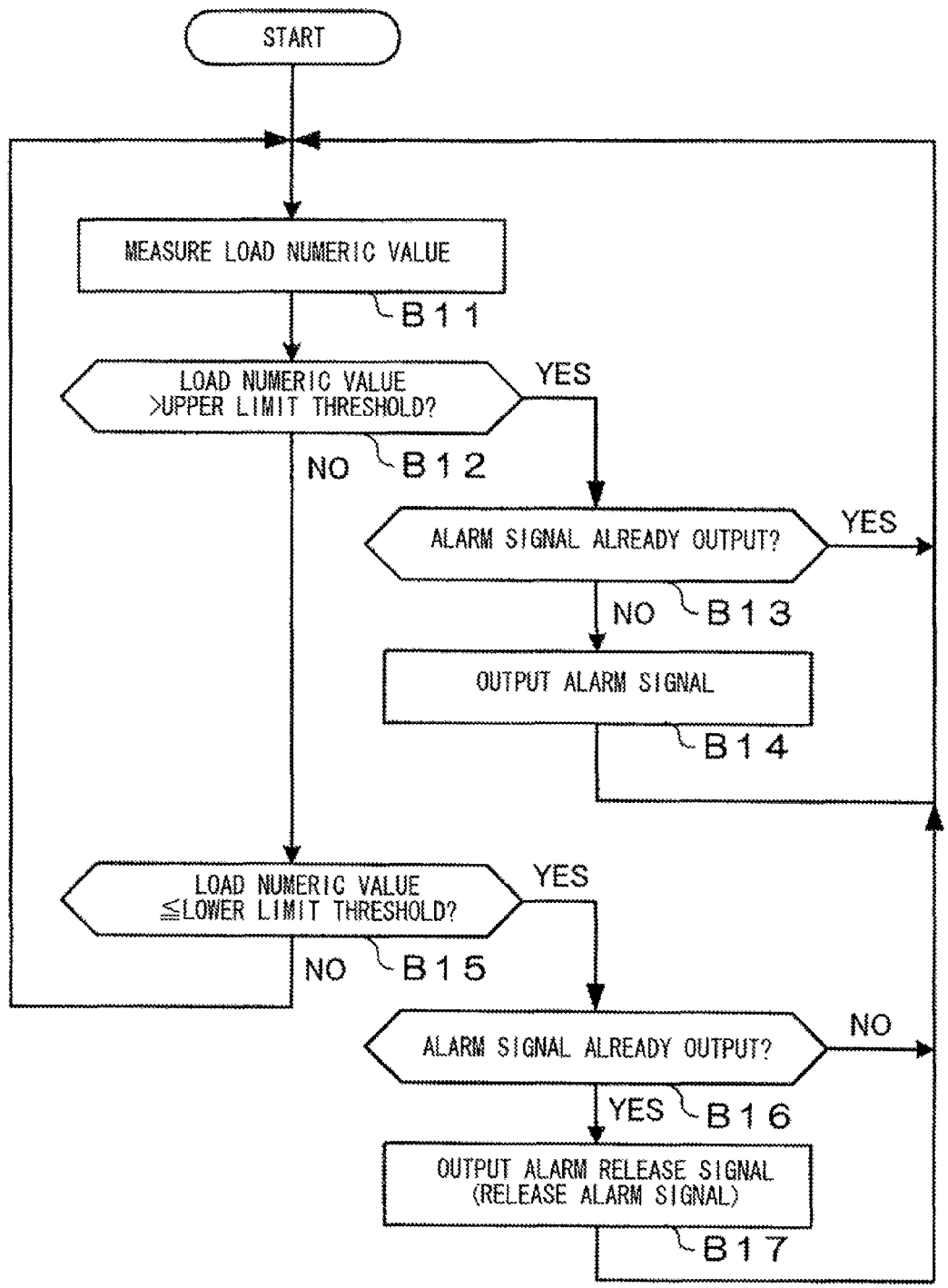
FIG. 10 is a flowchart showing an example of a process flow of a load state management means 63.

FIG. 10 is a flowchart showing an example of a process flow of the load state management means 63. As shown in. FIG. 10, the load state management means 63, for example, periodically measures the load numeric value indicating the load state of the entire apparatus that builds the speech recognition system (step B11). Note that the load state management means 63 may measure the load numeric value at the timing when the recognition process is performed to the speech signal by a certain time unit, for example. Note that an existing means to measure the load numeric value may be used, and the measurement process may be omitted by reading the load numeric value from the corresponding means. If the system is composed of a plurality of apparatuses, the load numeric value may be the load numeric value of the entire system, for example, by averaging the load numeric values of each apparatus.

If the load numeric value is obtained, evaluation is performed whether or not the load numeric value exceeds the upper limit threshold (step B12). At this time, if the upper limit threshold is exceeded, evaluation is performed on the output state of the alarm signal, and if the alarm signal is not already output (NO in step B13), then the alarm signal is output (step B14). After that, the process returns to the step A11, and wait for the next measurement timing. On the other hand, if the alarm signal is already output (YES in step B13), no process is especially performed but the process may return to the step B11.

Next, the load state management means 63 evaluates whether the obtained load numeric value is less than or equal to the lower limit threshold (step B15). At this time, if the load numeric value is less than or equal to the lower limit threshold, the output state of the alarm signal is evaluated, and if the alarm signal is already output (YES in step B16), the alarm release signal is output (step B17). Then, the process returns to the step B11 and wait for the next measurement timing. On the other hand, if the alarm signal is already output (NO in step B16), no process is especially performed and the process may return to the step B11.

Note that the load state management means 63 can output the alarm signal or the alarm release signal according to the load fluctuation in the future not only monitoring the current load state. For example, if the image processing process is previously known to start at a certain time, it is possible to output the alarm signal immediately before the start or outputs the alarm release signal at the point when the image processing process is completed.

In this way, according to this embodiment, processes other than the speech recognition process are executed in parallel in the system, and it is possible to perform the speech recognition process according to the load state of the system if the load of the system fluctuates depending on the state of the process.

In the above embodiments, the present invention is explained as a configuration of hardware, however the present invention is not limited to this. The present invention can be realized by a CPU (Central Processing Unit) executing a computer program for arbitrary processes. In this case, the computer program can be stored on a storage medium to be provided or provided by transmission via the Internet and other communication media. Further, the storage medium includes, for example, a flexible disc, a hard disc, a magnetic disk, a magneto-optical disc, a CD-ROM, a DVD, a ROM cartridge, a RAM memory cartridge with a battery backup, a flash memory cartridge, and a nonvolatile RAM cartridge. Moreover, the communication media includes a wired communication media such as a telephone line, a wireless communication media such as a microwave wave like or the like.

Although the present invention is explained with reference to the embodiments (and examples) so far, the present invention is not limited to the above embodiments (and examples). Various modifications that can be understood by the person skilled in the art within the scope of the present invention can be made to the configuration and detail of the present invention.

INDUSTRIAL APPLICABILITY

According to the present invention, it is possible to preferably apply to an embedded system that requires information search by speech dialogues such as a portable terminal and a car navigation system, and a robot assumed to communicate with people.

REFERENCE SIGNS LIST 10 and 11 VOICE INPUT MEANS
20 and 21 OUTPUT EVALUATION MEANS
30 and 31 SIGNAL PROCESSING MEANS
40 and 41 VOICE RECOGNITION PROCESSING MEANS
50 DELAY TIME MEASUREMENT MEANS
52 DELAY EVALUATION MEANS
60 LOAD MONITOR MEANS
63 LOAD STATE MANAGEMENT MEANS

The invention claimed is:

1. A speech recognition system comprising:
a speech input unit that inputs a speech signal using a plurality of speech input channels, the speech input channels including a channel for speech collection and a channel for noise collection;
an output evaluation unit that evaluates whether or not the speech signal of the channel for speech collection input by the speech input unit is the speech signal in a sound section, evaluates whether or not the speech signal of the channel for noise collection input by the speech input unit is the speech signal in an adaptive speech section ,and outputs the speech signal as the speech signal to be processed only when the speech signal is evaluated as the speech signal in the sound section or the speech signal in the adaptive speech section, the sound section being a speech section that assumes a speaker is speaking, and the adaptive speech section being the speech section which is required at a time of environment adaptation in a signal process or a speech recognition process;
a signal processing unit that performs signal processing to the speech signal output by the output evaluation unit as the speech signal to be processed;
a speech recognition processing unit that performs a speech recognition process to the speech signal, the speech signal being signal-processed by the signal processing unit; and
a delay time measurement unit that measures delay time by a process for the speech signal;
wherein the output evaluation unit changes an evaluation method of the speech signal, which is output to be processed, according to the delay time measured by the delay time measurement unit, and
the delay time measurement unit measures the delay time in the signal process by the signal processing unit calculating a time difference between time when a certain speech signal is input to the signal processing unit from the output evaluation unit and time when the certain speech signal is output from the signal processing unit.

2. A speech recognition system comprising:
a speech input unit that inputs a speech signal using a plurality of speech input channels, the speech input channels including a channel for speech collection and a channel for noise collection;
an output evaluation unit that evaluates whether or not the speech signal of the channel for speech collection input by the speech input unit is the speech signal in a sound section, evaluates whether or not the speech signal of the channel for noise collection input by the speech input unit is the speech signal in an adaptive speech section ,and outputs the speech signal as the speech signal to be processed only when the speech signal is evaluated as the speech signal in the sound section or the speech signal in the adaptive speech section, the sound section being a speech section that assumes a speaker is speaking, and the adaptive speech section being the speech section which is required at a time of environment adaptation in a signal process or a speech recognition process;

a signal processing unit that performs signal processing to the speech signal output by the output evaluation unit as the speech signal to be processed;

a speech recognition processing unit that performs a speech recognition process to the speech signal, the speech signal being signal-processed by the signal processing unit; and a delay time measurement unit that measures delay time by a process for the speech signal;

wherein the output evaluation unit changes an evaluation method of the speech signal, which is output to be processed, according to the delay time measured by the delay time measurement unit, and the delay time measurement unit measures the delay time in the signal processing by the signal processing unit and the speech recognition process by the speech recognition processing unit by calculating a time difference between when a certain speech signal is input to the signal processing unit from the output evaluation unit and when the recognition process is completed by the speech recognition processing unit.

3. A speech recognition system comprising:

a speech input unit that inputs a speech signal using a plurality of speech input channels, the speech input channels including a channel for speech collection and a channel for noise collection;

an output evaluation unit that evaluates whether or not the speech signal of the channel for speech collection input by the speech input unit is the speech signal in a sound section, evaluates whether or not the speech signal of the channel for noise collection input by the speech input unit is the speech signal in an adaptive speech section ,and outputs the speech signal as the speech signal to be processed only when the speech signal is evaluated as the speech signal in the sound section or the speech signal in the adaptive speech section, the sound section being a speech section that assumes a speaker is speaking, and the adaptive speech section being the speech section which is required at a time of environment adaptation in a signal process or a speech recognition process;

a signal processing unit that performs signal processing to the speech signal output by the output evaluation unit as the speech signal to be processed;

a speech recognition processing unit that performs a speech recognition process to the speech signal, the speech signal being signal-processed by the signal processing unit; and a load monitor unit that monitors process load of an entire apparatus that builds the speech recognition system, wherein the output evaluation unit changes the evaluation method of the speech signal to be processed according to the process load monitored by the load monitor unit.

4. A speech recognition method comprising:

among speech signals input via a speech input unit using a plurality of speech input channels, the speech input channels including a channel for speech collection and a channel for noise collection, evaluating whether or not a speech signal is the speech signal in a sound section using the speech signal of the channel for speech collection, evaluating whether or not the speech signal is the speech signal in an adaptive speech section using the speech signal of the channel for noise collection, and outputting the speech signal as a process of signal processing only when the speech signal is evaluated as the speech signal in the sound section or the speech signal in the adaptive speech section, the sound section being a speech section that assumes a speaker is speaking, and the adaptive speech section being the speech section which is required at a time of environment adaptation in a signal process or a speech recognition process;

performing the signal processing to the speech signal output as the process of the signal processing; and performing a speech recognition process to the speech signal-processed signal;

monitoring process load of an entire apparatus that executes a process for the speech recognition including the speech recognition process; and changing the evaluation method of the speech signal, which is output to perform the signal processing thereto, according to the monitored process load.

5. A non-transitory machine readable storage medium storing a program for speech recognition that causes a computer to execute a process, the process comprising;

an output evaluation process that, among speech signals input via a speech input unit using a plurality of speech input channels, the speech input channels including a channel for speech collection and a channel for noise collection, evaluates whether or not a speech signal is the speech signal in a sound section using the speech signal of the channel for speech collection, evaluates whether or not the speech signal is the speech signal in an adaptive speech section using the speech signal of the channel for noise collection, and outputs the speech signal as a process of signal processing only when the speech signal is evaluated as the speech signal in the sound section or the speech signal in the adaptive speech section, the sound section being a speech section that assumes a speaker is speaking, and the adaptive speech section being the speech section which is required at a time of environment adaptation in a signal process or a speech recognition process;

the signal processing to the speech signal output as the process of the signal processing;

a speech recognition process to the signal-processed speech signal;

executing a process to monitor process load of an entire apparatus that executes a process for the speech recognition including the speech recognition process; and in the output evaluation process, changing the evaluation method of the speech signal, which is output to perform the signal processing thereto, according to the monitored process load.

6. A speech recognition system comprising:

a speech input means that inputs a speech signal using a plurality of speech input channels, the speech input channels including a channel for speech collection and a channel for noise collection;

an output evaluation means that evaluates whether or not the speech signal of the channel for speech collection input by the speech input means is the speech signal in a sound section, evaluates whether or not the speech signal of the channel for noise collection input by the speech input means is the speech signal in an adaptive speech section ,and outputs the speech signal as the speech signal to be processed only when the speech signal is evaluated as the speech signal in the sound section or the speech signal in the adaptive speech section, the sound section being a speech section that assumes a speaker is speaking, and the adaptive speech section being the speech section which is required at a time of environment adaptation in a signal process or a speech recognition process;

a signal processing means that performs signal processing to the speech signal output by the output evaluation means as the speech signal to be processed;

a speech recognition processing means that performs a speech recognition process to the speech signal, the speech signal being signal-processed by the signal processing means; and a load monitor means that monitors process load of an entire apparatus that builds the speech recognition system, wherein the output evaluation means changes the evaluation method of the speech signal to be processed according to the process load monitored by the load monitor means.

* * * * *